United States Patent
Yen et al.

(10) Patent No.: US 8,363,148 B2
(45) Date of Patent: Jan. 29, 2013

(54) IMAGE CAPTURING DEVICE WITH MULTIPLE IMAGE CAPTURING MODES AND ELECTRONIC DEVICE USING SAME

(75) Inventors: Shih-Chieh Yen, Taipei Hsien (TW); Sheng-Jung Yu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 214 days.

(21) Appl. No.: 12/688,973

(22) Filed: Jan. 18, 2010

(65) Prior Publication Data

US 2011/0019072 A1 Jan. 27, 2011

(30) Foreign Application Priority Data

Jul. 23, 2009 (CN) .......................... 2009 1 0304749

(51) Int. Cl.
*G02B 13/16* (2006.01)
*H04N 5/225* (2006.01)
(52) U.S. Cl. .................. 348/335; 348/369; 359/196.1; 359/201.1; 359/201.2; 359/211.4; 359/211.5; 359/212.1
(58) Field of Classification Search .................. 348/369, 348/33, 335; 359/196.1, 201.1, 201.2, 211.4, 359/211.5, 212.1
See application file for complete search history.

(56) References Cited

U.S. PATENT DOCUMENTS

| 5,587,787 | A | * | 12/1996 | Jager | 356/141.1 |
|---|---|---|---|---|---|
| 6,041,195 | A | * | 3/2000 | Honda et al. | 396/429 |
| 6,421,158 | B1 | * | 7/2002 | Yeh | 359/212.1 |
| 6,587,597 | B1 | * | 7/2003 | Nakao et al. | 382/284 |
| 7,483,151 | B2 | * | 1/2009 | Zganec et al. | 356/602 |
| 2002/0080460 | A1 | * | 6/2002 | Yeh | 359/212 |
| 2007/0047114 | A1 | * | 3/2007 | Shih | 359/866 |
| 2007/0160362 | A1 | * | 7/2007 | Mitsuo et al. | 396/373 |
| 2007/0216769 | A1 | * | 9/2007 | Zganec et al. | 348/139 |
| 2010/0231902 | A1 | * | 9/2010 | Markwort et al. | 356/237.2 |
| 2011/0043796 | A1 | * | 2/2011 | Markwort et al. | 356/237.2 |
| 2011/0043798 | A1 | * | 2/2011 | Markwort et al. | 356/237.5 |

* cited by examiner

*Primary Examiner* — Chieh M Fan
*Assistant Examiner* — Antoinette Spinks
(74) *Attorney, Agent, or Firm* — Altis Law Group, Inc.

(57) ABSTRACT

An image capturing device includes a housing defining an aperture, a first lens module arranged inside the housing, a second lens module arranged inside the housing, and a light reflection assembly aligned with the aperture. The first lens module and the second lens module are positioned at opposite sides of the aperture. The light reflection assembly includes a reflecting mirror. The light reflection assembly is rotatable between a first position where the reflecting mirror reflects light from the aperture towards the first lens module and a second position where the reflecting mirror reflects light from the aperture towards the second lens module.

20 Claims, 4 Drawing Sheets

IMAGE CAPTURING DEVICE WITH MULTIPLE IMAGE CAPTURING MODES AND ELECTRONIC DEVICE USING SAME

BACKGROUND

1. Technical Field

The present disclosure relates to imaging technologies and, particularly, to an image capturing device having multiple image capturing modes and an electronic device using the same.

2. Description of Related Art

With ongoing developments in imaging and multimedia technology, image capturing devices have become widely used in some kinds of consumer electronic devices, such as cellular phones, laptops, digital cameras, personal digital assistants (PDAs), etc. In addition, there is a growing demand for developing more image capturing devices with multiple functions, such as image capturing devices having multiple image capturing modes with different functions.

Therefore, an image capturing device with multiple image capturing modes and an electronic device using the same are needed.

BRIEF DESCRIPTION OF THE DRAWINGS

Many aspects of the present image capturing device and the present electronic device can be better understood with reference to the following drawings. The components in the drawings are not necessarily to scale, the emphasis instead being placed upon clearly illustrating the principles of the image capturing device and the electronic device. Moreover, in the drawings, like reference numerals designate corresponding parts throughout the several views.

DETAILED DESCRIPTION

Figure 1:
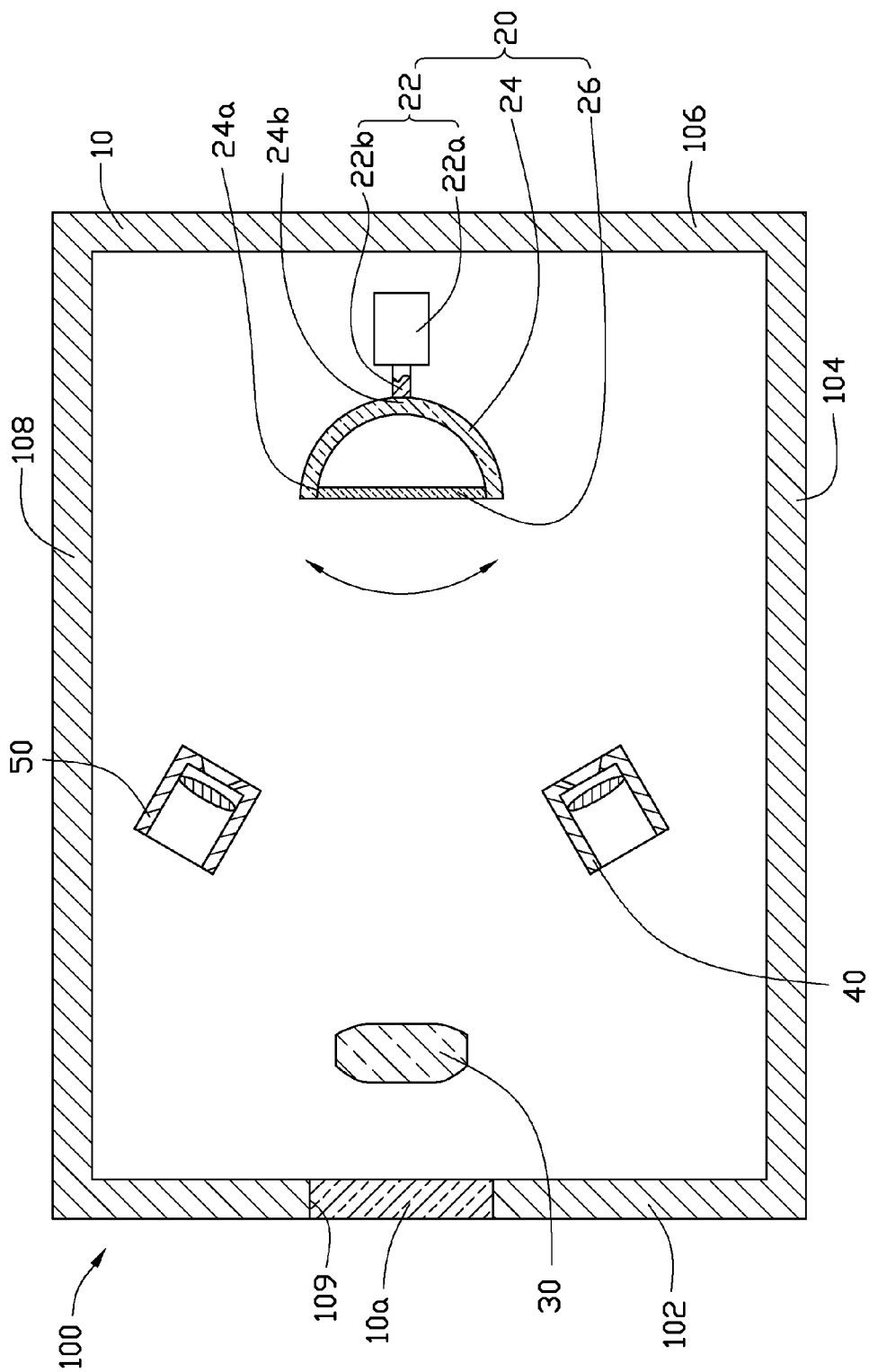
FIG. 1 is a sectional view of an image capturing device, according to a first exemplary embodiment.

Referring to FIG. 1, an image capturing device 100, according to a first exemplary embodiment, includes a housing 10, inside of which are a light refection assembly 20, a collimating lens 30, a first lens module 40, and a second lens module 50.

The housing 10 is approximately rectangular and includes a first sidewall 102, a second sidewall 104, a third sidewall 106 opposite to the first sidewall 102, and a fourth sidewall 108 opposite to the second sidewall 104. The first sidewall 102, the second sidewall 104, the third sidewall 106, and the fourth sidewall 108 are connected to each other end to end. An aperture 109 is defined in the first sidewall 102 facing the third sidewall 106.

The image capturing device 100 further includes an infrared (IR) cut-off filter 10a. The IR cut-off filter 10a is fixed to the first sidewall 102 to seal the aperture 109. The IR cut-off filter 10a is configured for blocking IR light while allowing visible light to pass.

The light reflection assembly 20 is positioned adjacent to the third sidewall 106 and aligned with the IR cut-off filter 10a. The light reflection assembly 20 includes a driving member 22, a cover 24, and a reflecting mirror 26.

The driving member 22 includes a body 22a and a driving rotation shaft 22b extending from the body 22a. The cover 24 is a hollow hemispheroid and defines an opening 24a and a top portion 24b facing away from the opening 24a. The cover 24 is hinge-mounted to the shaft 22b at the top portion 24b. The reflecting mirror 26 is fixed to the cover 24 to seal the opening 24a. When the body 22a is activated, the shaft 22b rotates. The cover 24 rotates with the rotation of the shaft 22b. Thus, orientation of the reflecting mirror 26 can be changed.

The collimating lens 30 is positioned between the IR cut-off filter 10a and the light reflection assembly 20. The collimating lens 30 is nearer the IR cut-off filter 10a than the light reflection assembly 20 is to the collimating lens 30 in this embodiment. The collimating lens 30 is aligned with the IR cut-off filter 10a. The collimating lens 30 is configured for collimating light incident from the IR cut-off filter 10a into parallel light.

The first lens module 40 and the second lens module 50 are positioned at opposite sides of a light path of the parallel light between the collimating lens 30 and the light reflection assembly 20. The first lens module 40 is configured for receiving light in a first image capturing mode of the imaging capturing device 100 (see FIG. 2). The second lens module 50 is configured for receiving light in a second image capturing mode of the image capturing device 100 (see FIG. 3). Accordingly, the orientation of the reflecting mirror 26 is changed from a first position to a second position. In the first position, the light reflection assembly 20 reflects light towards the first lens module 40. In the second position, the light reflection assembly 20 reflects light towards the second lens module 50. Although not illustrated in the drawings, it is to be understood that two image sensors may be positioned at image sides of the two lens modules 40, 50, respectively to capture corresponding images. The first image capturing mode may be a micro-shot mode of the image capturing device 100 and the second image capturing mode may be a normal-shot mode of the image capturing device 100, depending on design of the image capturing device 100. Accordingly, the first lens module 40 may be a suitable lens module for the micro-shot mode of the image capturing device 100, and the second lens module 50 may be a suitable lens module for the normal-shot mode of the image capturing device 100.

In alternative embodiments, the first image capturing mode may be a 1× optical zoom mode of the image capturing device 100 and the second image capturing mode may be a 2× optical zoom mode of the image capturing device 100. Accordingly, the first lens module 40 may be a suitable lens module for the 1× optical zoom mode of the image capturing device 100, and the second lens module 50 may be a suitable lens module for the 2× optical zoom mode of the image capturing device 100.

Figure 2:
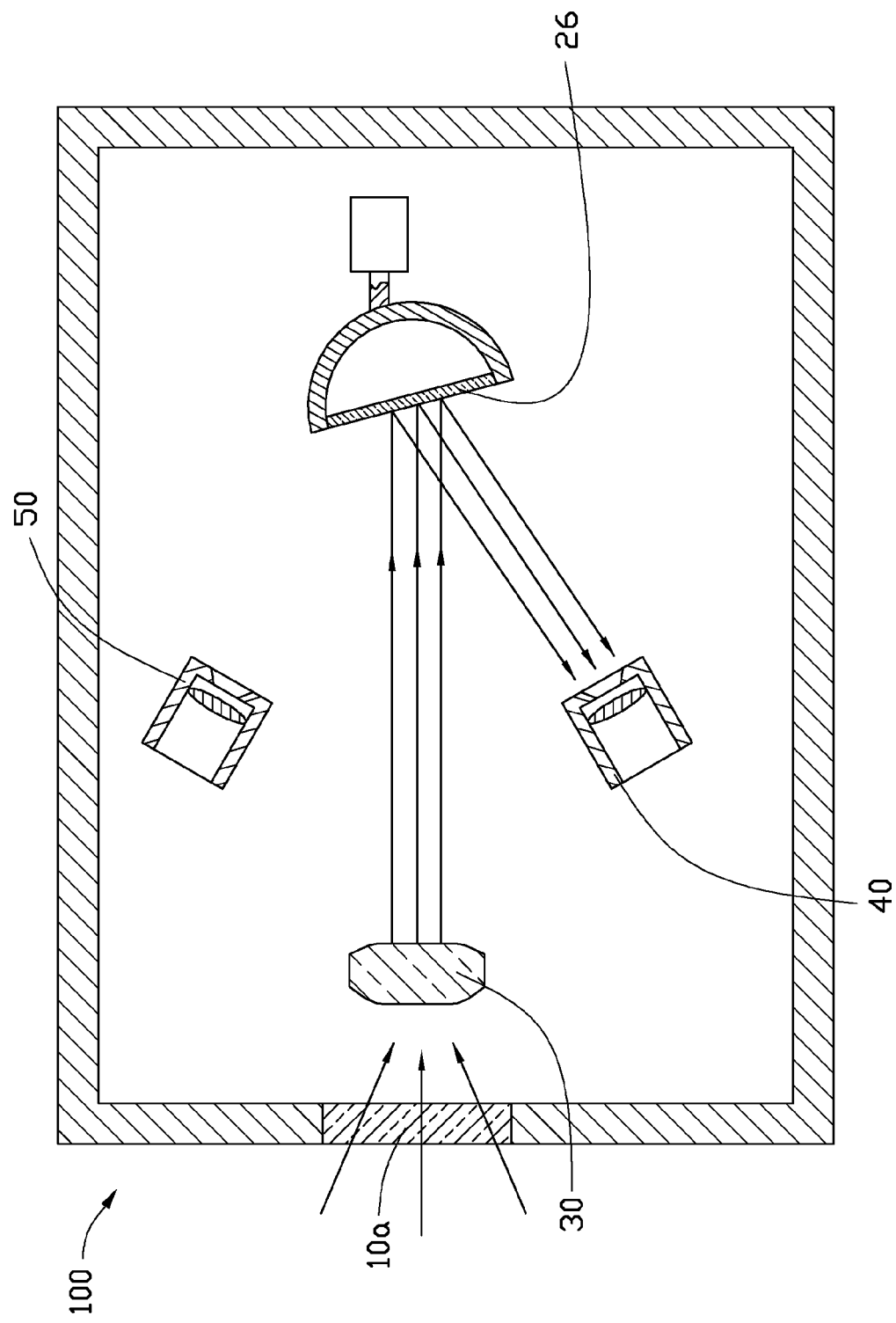
FIG. 2 is similar to FIG. 1, but showing the image capturing device working in a first image capturing mode.
Figure 3:
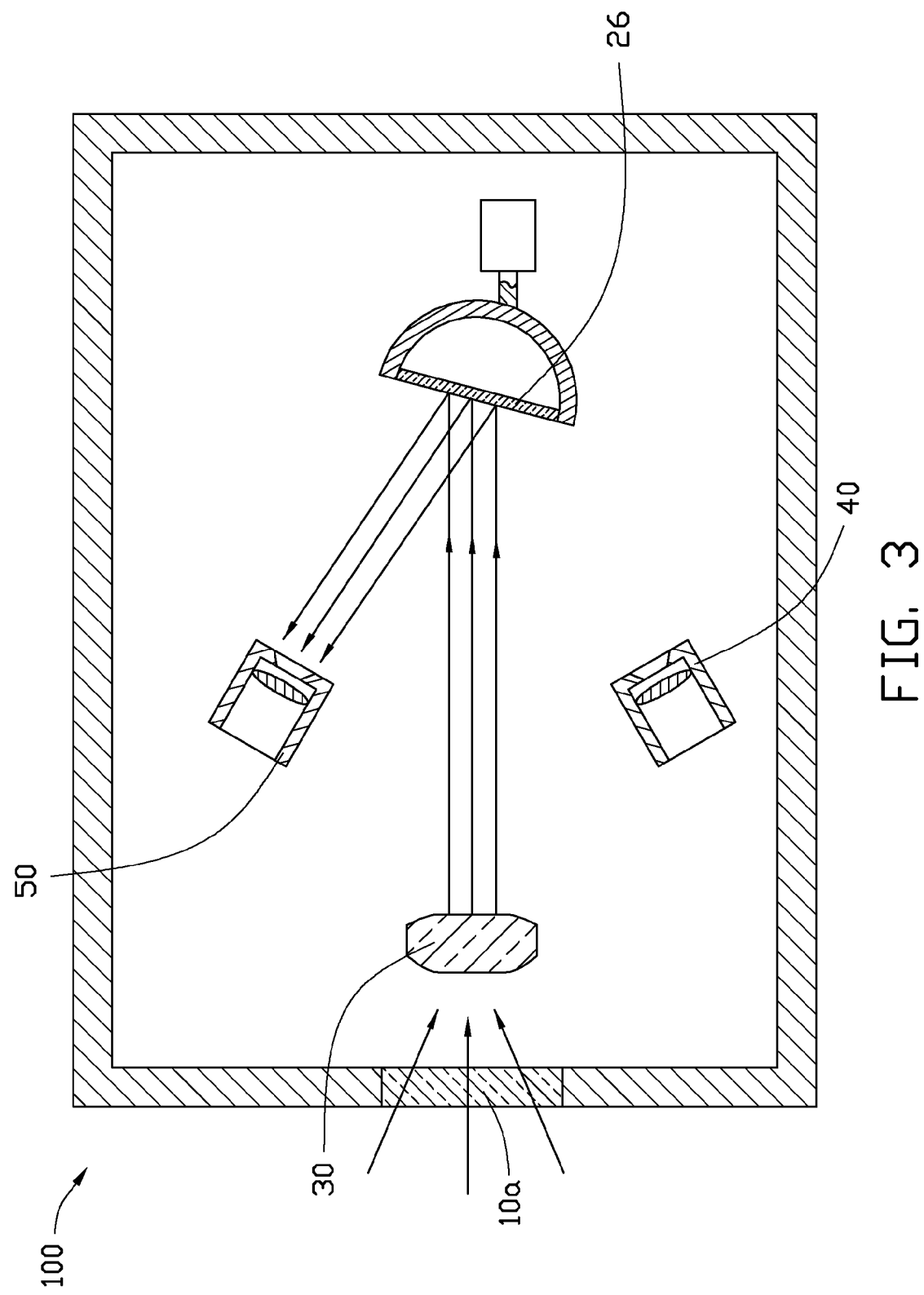
FIG. 3 is similar to FIG. 1, but showing the image capturing device working in a second image capturing mode.

Referring to FIGS. 2 and 3, when in use, the image capturing device 100 is working in the first image capturing mode, the reflecting mirror 26 is driven by the driving member 22 to the first position where the reflecting mirror 26 reflects light from the collimating lens 30 towards the first lens module 40. The image sensor (not illustrated) at the image side of the first lens module 40 captures a first image accordingly.

When the image capturing device 100 is working in the second image capturing mode, the reflecting mirror 26 is driven to the second position where the reflecting mirror 26 reflects the light from the collimating lens 30 towards the second lens module 40. The image sensor (not illustrated) at the image side of the second lens module 50 captures a second image accordingly. Therefore, the image capturing device 100 has two image capturing modes with different functions.

Figure 4:
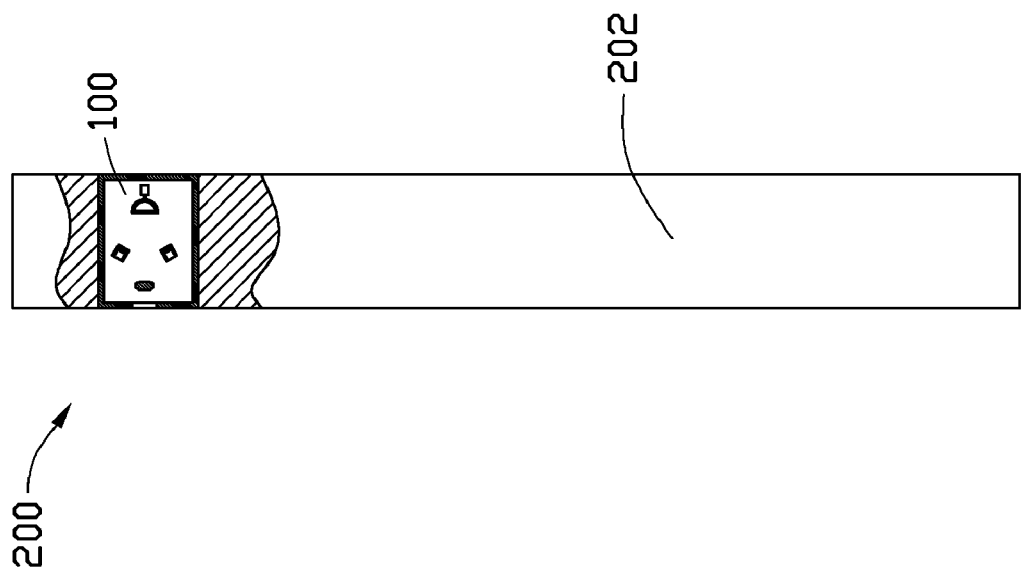
FIG. 4 is a partial sectional view of an electronic device including the image capturing device of FIG. 1, according to a second exemplary embodiment.

Referring to FIG. 4, an electronic device 200, such as a cellular phone, according to a second exemplary embodiment, includes a main body 202 and the image capturing device 100 of the first exemplary embodiment. The image capturing device 100 is received in the main body 202.

Advantages of the electronic device 200 of the second embodiment are similar to those of the image capturing device 100 of the first embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. An image capturing device, comprising:
   a housing defining an aperture;
   a first lens module arranged inside the housing;
   a second lens module arranged inside the housing; and
   a light reflection assembly aligned with the aperture and comprising a reflecting mirror rotatable between a first position where the reflecting mirror directly reflects light from the aperture towards the first lens module and a second position where the reflecting mirror directly reflects the light from the aperture towards the second lens module;
   wherein the first lens module and the second lens module are positioned at opposite sides of a light path of the light entering the housing through the aperture to the reflecting mirror.

2. The image capturing device as claimed in claim 1, wherein the housing is approximately rectangular and comprises a first sidewall, a second sidewall, a third sidewall opposite to the first sidewall, and a fourth sidewall opposite to the second sidewall; the first sidewall, the second sidewall, the third sidewall, and the fourth sidewall are connected to each other end to end; the aperture is defined in the first sidewall facing the third sidewall; the light reflection assembly is positioned adjacent to the third sidewall.

3. The image capturing device as claimed in claim 2, further comprising an infrared cut-off filter, wherein the infrared cut-off filter is fixed to the first sidewall to seal the aperture.

4. The image capturing device as claimed in claim 3, wherein the infrared cut-off filter is configured for blocking infrared light while allowing visible light to pass.

5. The image capturing device as claimed in claim 4, wherein the light reflection assembly further comprises a driving member and a cover; the cover is mounted to the driving member; and the reflecting mirror is fixed to the cover.

6. The image capturing device as claimed in claim 5, wherein the driving member comprises a body and a driving rotation shaft extending from the body; the cover is hinge-mounted to the shaft.

7. The image capturing device as claimed in claim 6, wherein the cover is hollow hemispheroid and defines an opening and a top portion facing away from the opening; the cover is hinge-mounted to the shaft at the top portion.

8. The image capturing device as claimed in claim 7, wherein the reflecting mirror is fixed to the cover to seal the opening; the driving member is configured for driving the cover to rotate with the rotation of the shaft.

9. The image capturing device as claimed in claim 3, wherein a collimating lens is positioned between the infrared cut-off filter and the light reflection assembly; the collimating lens is nearer the infrared cut-off filter than the light reflection assembly is to the collimating lens; the collimating lens is aligned with the infrared cut-off filter; and the collimating lens is configured for collimating light incident from the infrared cut-off filter into parallel light.

10. The image capturing device as claimed in claim 1, wherein the first lens module is configured for receiving light when the reflecting mirror is in the first position; and the second lens module is configured for receiving light when the reflecting mirror is in the second position.

11. An electronic device, comprising:
    a main body; and
    an image capturing device received in the main body, the image capturing device comprising:
        a housing defining an aperture;
        a first lens module arranged inside the housing;
        a second lens module arranged inside the housing; and
        a light reflection assembly aligned with the aperture and comprising a reflecting mirror rotatable between a first position where the reflecting mirror directly reflects light from the aperture towards the first lens module and a second position where the reflecting mirror directly reflects the light from the aperture towards the second lens module;
        wherein the first lens module and the second lens module are positioned at opposite sides of a light path of the light entering the housing through the aperture to the reflecting mirror.

12. The electronic device as claimed in claim 11, wherein the housing is approximately rectangular and comprises a first sidewall, a second sidewall, a third sidewall opposite to the first sidewall, and a fourth sidewall opposite to the second sidewall; the first sidewall, the second sidewall, the third sidewall, and the fourth sidewall are connected to each other end to end; the aperture is defined in the first sidewall facing the third sidewall; the light reflection assembly is positioned adjacent to the third sidewall.

13. The electronic device as claimed in claim 12, further comprising an infrared cut-off filter, wherein the infrared cut-off filter is fixed to the first sidewall to seal the aperture.

14. The electronic device as claimed in claim 13, wherein the infrared cut-off filter is configured for blocking infrared light while allowing visible light to pass.

15. The electronic device as claimed in claim 14, wherein the light reflection assembly further comprises a driving member and a cover; the cover is hinge-mounted to the driving member; and the reflecting mirror is fixed to the cover.

16. The electronic device as claimed in claim 15, wherein the driving member comprises a body and a driving rotation shaft extending from the body; the cover is hinge-mounted to the shaft.

17. The electronic device as claimed in claim 16, wherein the cover is hollow hemispheroid and defines an opening and a top portion facing away from the opening; the cover is hinge-mounted to the shaft at the top portion.

18. The electronic device as claimed in claim 17, wherein the reflecting mirror is fixed to the cover to seal the opening; the driving member configured for driving the cover to rotate with the rotation of the shaft.

19. The electronic device as claimed in claim 13, wherein a collimating lens is positioned between the infrared cut-off filter and the light reflection assembly; the collimating lens is nearer the infrared cut-off filter than the light reflection assembly to the collimating lens; the collimating lens is aligned with the infrared cut-off filter; and the collimating lens is configured for collimating light incident from the infrared cut-off filter into parallel light.

20. The electronic device as claimed in claim 11, wherein the first lens module is configured for receiving light when the reflecting mirror is in the first position; and the second lens module is configured for receiving light when the reflecting mirror is in the second position.

* * * * *